United States Patent [19]

DiGregorio et al.

[11] Patent Number: 4,936,982
[45] Date of Patent: Jun. 26, 1990

[54] INTRACHANNEL CLARIFIER

[75] Inventors: David DiGregorio; Mark G. Biesinger; Brent C. Black, all of Salt Lake City, Utah

[73] Assignee: Baker Hughes, Inc., Houston, Tex.

[21] Appl. No.: 326,143

[22] Filed: Mar. 20, 1989

[51] Int. Cl.⁵ .............................................. C02F 3/14
[52] U.S. Cl. ................................. 210/195.3; 210/256; 210/261; 210/519; 210/534; 210/926
[58] Field of Search ..................... 210/194, 195.3, 256, 210/261, 320, 519, 534, 926

[56] References Cited

U.S. PATENT DOCUMENTS

| | | | |
|---|---|---|---|
| 3,421,626 | 1/1969 | Schramm et al. | 210/256 |
| 4,303,516 | 12/1981 | Stensel et al. | 210/525 |
| 4,362,625 | 12/1982 | Beard | 210/521 |
| 4,383,922 | 5/1983 | Beard | 210/521 |
| 4,487,692 | 12/1984 | Kersten | 210/194 |
| 4,780,206 | 10/1988 | Beard et al. | 210/926 |

FOREIGN PATENT DOCUMENTS 2075856 11/1981 United Kingdom .

OTHER PUBLICATIONS

Journal WPCF, vol. 59, No. 10, pp. 871–876 referenced on page 3, lines 23 et al., Oct. 1987.

Primary Examiner—Richard V. Fisher
Assistant Examiner—Christopher Upton
Attorney, Agent, or Firm—Skjerven, Morrill, MacPherson

[57] ABSTRACT

A combined oxidation orbital ditch and intraclarifier has the intraclarifier in the form of an elongated clarifier vessel positioned on the top of a section of the center partition between the ditch sidewalls so that the overall clarifier vessel extends laterally into both of a pair of flow channels formed between the ditch sidewalls and the center partition but is spaced from the ditch sidewalls so as to minimize impediment of the mixed liquor flow being treated in the channels. A gated inlet below the flow surface is provided in the one half of the bow of the vessel facing into the mixed liquor flow for diverting a portion of the flow into the clarifier. That flow portion is distributed over the entire width of the vessel and arrested in flow velocity so that settling of sludge can be performed downstream in the vessel. Clarified liquid removal troughs are provided at the stern end of the vessel and sludge ports are provided in the vessel bottom to transport settled sludge into the mixed liquor flowing under the vessel width.

36 Claims, 3 Drawing Sheets

U.S. Patent   Jun. 26, 1990   Sheet 1 of 3   4,936,982
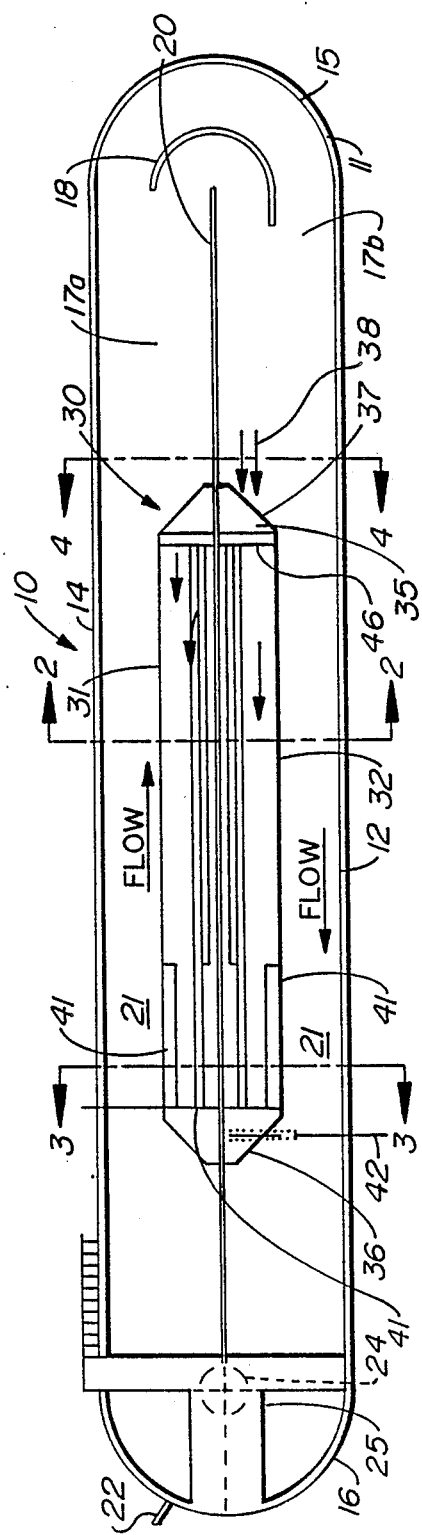
FIG._1
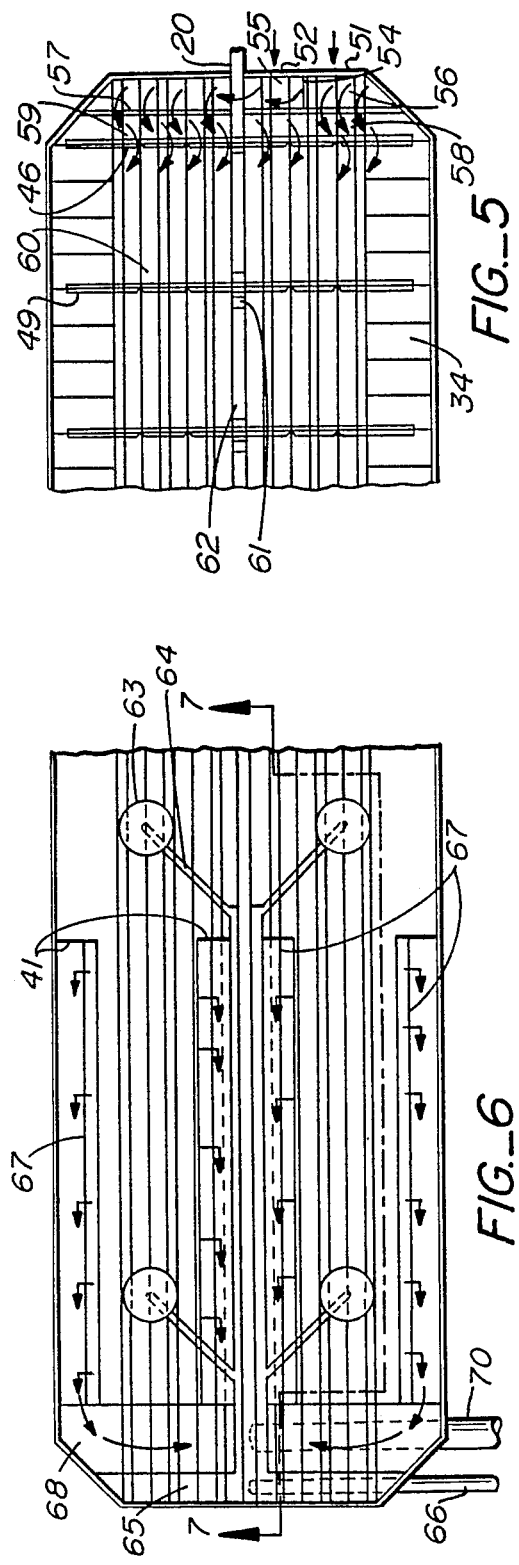
FIG._5
FIG._6

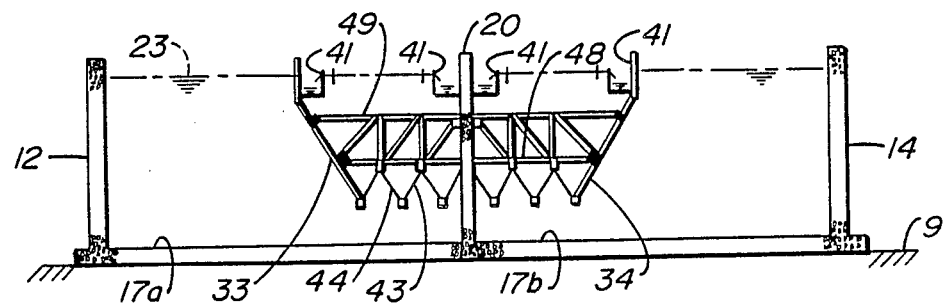
FIG._3
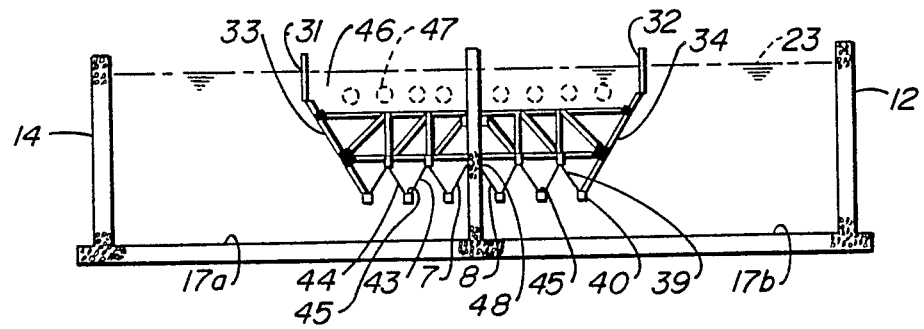
FIG._2
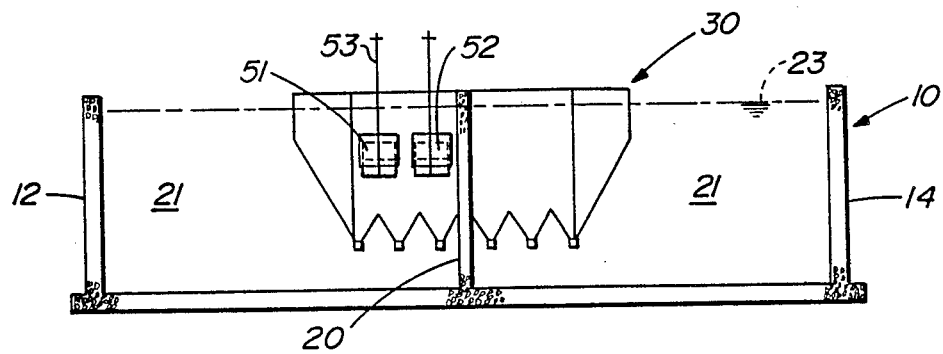
FIG._4

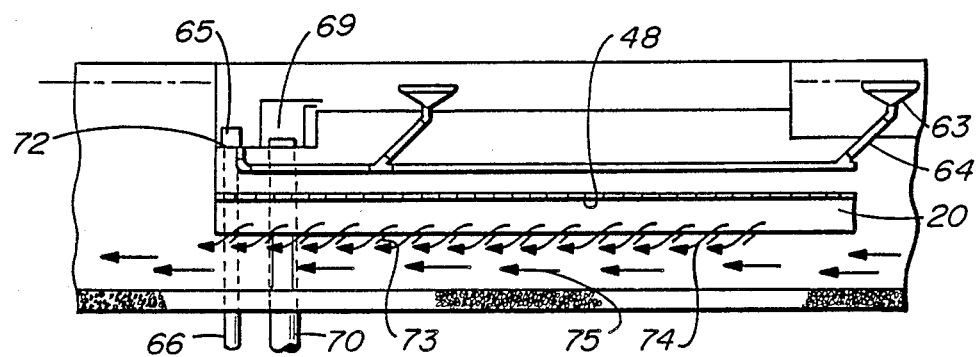
FIG._7
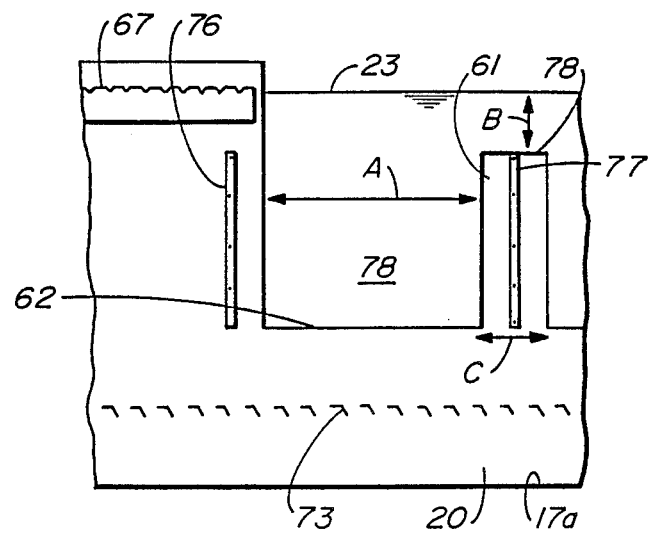
FIG._8

INTRACHANNEL CLARIFIER

BACKGROUND OF THE INVENTION

1. Field of the Invention

This invention relates to a system for treating water, wastewater and other liquid-solid solutions where a clarification step is to be employed. More particularly, the invention is directed to an oxidation ditch with a clarifier incorporated within the ditch confines.

2. State of the Art

Domestic sewage and industrial wastewater often contain impurities which include materials such as sugars and other carbohydrates and proteins and other forms of nitrogen. Many of these impurities or pollutants are decomposable by microorganisms, and there are various types of systems to remove the impurities from wastewater by action of microorganisms. One type of wastewater treatment system is known as an orbital system, sometimes referred to as an oxidation ditch system.

Orbital wastewater treatment systems include an elongated tank having two sidewalls and at least one partition wall mounted vertically in the tank substantially parallel to the two sidewalls and spaced apart from the ends of the tank. The tank and partition wall together form an endless, circuitous channel to contain a stream of mixed liquor. An orbital wastewater treatment system also includes means to cause the liquid to flow through the channel and an aerating means to introduce air into the liquid to provide oxygen for the microorganisms. Various mechanisms can be used for such purposes including a surface aerator, a rotary perforated disc-type aeration mixer or a rotating brush aerator. Orbital wastewater treatment systems are taught, for example, in U.S. Pat. Nos. 3,510,110 and 3,846,292. According to U.S. Pat. No. 3,846,292 influent wastewater is introduced into the tank and driven to flow around the endless, circuitous channel. A stream of treated liquid, less than the total flow in the channel, is removed from the channel and transferred into a solid-liquid separator, or clarifier, spaced apart from the orbital system. In the separator, solid particles form sludge which settles, and part of the sludge is returned to the orbital system to mix with the wastewater to form mixed liquor. Clarified liquid is transferred from the separator to a stream or other body of water or sent to further treatment. The purpose of returning sludge to the orbital system is to maintain a predetermined concentration of microorganisms in the mixed liquor thereby to accomplish biological removal of pollutants from the wastewater.

The construction of a conventional orbital system such as taught in the above patents requires that the circuitous channel be constructed and that a separate sludge separation system also be added. Additionally, a system of pipes and pumps must be installed to permit diversion of wastewater from the orbital system to the separator and for return of sludge from the separator to the orbital system.

As discussed in U.S. Pat. No. 4,303,516 (Stensel et al.) assigned to a predecessor of applicants' assignee and as practiced in 1981 at a wastewater treatment plant at Campbellsville, Ky. and later at Owensboro, Ky., a rectangularly shaped clarifier is disposed in an orbital channel between a channel wall and partition with a frontal top weir to receive a portion of the overall mixed liquor flowing through the orbital channel. The mixed liquor portion passed down the clarifier co-currently with the main orbital channel flow into a clarifier quiescent zone. Biological sludge is settled in the clarifier for removal through ports in the clarifier bottom back into the orbital channel mixed liquor flow and clarified liquor removed by overflow into effluent troughs alongside the partition wall and extending over a substantial length of the top of the clarifier. In the '516 patent one embodiment employs a dipped orbital channel portion so that the orbital channel flow has substantially the same cross-sectional area throughout its length. In the Campbellsville installation, the clarifier was installed over the same channel floor elevation as the remainder of the orbital channel and thus the remaining orbital channel flow at that location had less of a cross-sectional area that the remaining areas of the channels.

U.S Pat. Nos. 4,362,625; 4,383,922; 4,457,849 and 4,780,206 to Beard also show intrachannel clarifiers which involve a boat-shaped structure positioned in a channel with its bow directed into the wastewater flow and providing a stern or rear inlet for entry of a portion of the wastewater flow with that portion being flowed in the clarifier countercurrently to the channel flow at the bow of the clarifier structure. Sludge is settled in the clarifier and flows back into the channel between rows of vertical plates or through tubes. An effluent launder is positioned in a forward bow section of the clarifier structure.

Various other types of intrachannel clarifiers including modifications of the Stensel et al. patent and the Beard boat structure are shown and discussed in an article entitled "Assessment of design trade-offs when using intrachannel clarifiers" by Jon H. Bender of the U.S. Environmental Protection Agency published in the October 1987 issue of the Journal WPCF Volume 59 Number 10, pages 871–876. As set forth in the article, an intrachannel clarifier must not negatively impact the mixed liquor flow velocity in the orbital channel. All intrachannel clarifiers restrict the circulating flow of mixed liquor in the aeration channel to a certain degree. Such restrictions must be minimized to maintain adequate channel velocities without requiring additional power to the aerator or other propelling means for the mixed liquor. The capability of the aeration device to overcome headlosses in the channel also must be considered.

The article also indicates that consideration must also be given to the effect of aerator channel and clarifier maintenance in an intrachannel clarifier system. Proper adjustment of sludge return flows from the clarifier to the orbital channel are also a factor. Paramount to any intrachannel clarifier is the cost-effectiveness in terms of original cost, operational (power) costs, operational manpower costs, maintenance cost and longevity.

SUMMARY OF THE INVENTION

The invention disclosed herein results in a waste matter or other liquid-solids treatment system involving a clarification operation which minimizes diminution of mixed liquor flow velocity and the head loss in the orbital channel(s) due to the presence of an intrachannel clarifier therein. The disclosed system is of a type which substantially minimizes the amount of concrete and labor required in constructing the system and utilizes the mixed liquor flow in the channel to positively force inlet flow by providing an inlet in one-half of the clarifier bow facing forward into the channel mixed liquor flow. Further, the clarifier inlet ensures that there is a diminished slower positive flow of influent in the intraclarifier vessel. Likewise, settled sludge removal is positive since its flow rate can be controlled by the amount of mixed liquor forceably fed into and entering the clarifier inlet over and above the flow of settled effluent.

The particular intrachannel configuration disclosed and its location relative to the sidewalls and elongated partition of an orbital channel treatment system results in a clarifier of suitable surface area and volume while only encroaching on well less than half the full cross-sectional area of the orbital channels in which it is mounted. In one embodiment, the cross-section of the intrachannel clarifier is about 72 sq.ft. in about a 242 sq.ft. channel thus providing only about a 30% encroachment, thus greatly minimizing the restriction of mixed liquor flow in a channel. It is believed that prior art intrachannel clarifiers which are placed in one channel only block out over 50% of the mixed liquor flow in the channel by cutting the open cross-sectional area more than 50%.

The above desirable results are obtained by providing an elongated top-facing notch or series of notches in the center partition between two sidewalls of the orbital ditch and positioning the clarifier in the notch(es) so that, in effect, the outer sidewalls of the clarifier function as the flow partition wall as an extension of the partition wall into the orbital channel. It is thus seen that there is an inherent saving in concrete and construction costs of the resultant smaller central partition. This construction leaves a major amount of each flow channel, particularly the outer periphery thereof completely unimpeded by the intrachannel clarifier.

The intrachannel clarifier of the invention occupies only a relatively small fraction of the oxidation ditch channel cross-sectional area as compared to prior art devices. This causes the mixed liquor flow velocity in the channel to increase, in the area of the intrachannel clarifier, only slightly above what it is in other portions of the tank. For example, in one embodiment of the invention, the increase in velocity has been calculated as 0.3 ft/sec., whereas in prior art intraclarifiers, the increase of velocity may well be over 1 foot/second. This aspect of the invention substantially reduces the headloss in the channel caused by the intrachannel clarifier (headless is proportional to the square of the velocity), resulting in a reduced consumption of energy (in the form of aerator horsepower) to overcome the headloss.

In the preferred embodiment of the invention the intrachannel clarifier actually straddles a lowered section of the center partition of the orbital ditch so that the respective opposite longitudinal sidewalls and a longitudinal bottom half of the clarifier each extend in cantilevered fashion from the center partition the same distance into opposed channels of the orbital ditch, i.e., the intrachannel clarifier is disposed essentially symmetrically across the central partition of the orbital ditch adjacent a mid-point of the partition. Further, the intrachannel clarifier is provided with downwardly and inwardly tapered sidewalls which acts as baffles and function to assist in transporting settling sludge to outer longitudinally-extending rows of sludge ports. Other longitudinally-extending central rows of sludge ports are bounded by longitudinal inwardly inclined plates which transport sludge settling centrally of the clarifier into such center sludge ports.

BRIEF DESCRIPTION OF THE DRAWINGS

FIG. 1 is a plan view of an orbital wastewater system having the intrachannel clarifier of the invention therewithin.

FIG. 2 is a cross-sectional view across the clarifier and the orbital ditch taken on the line 2—2 of FIG. 1.

FIG. 3 is a cross-sectional view of the ditch and clarifier across the effluent troughs thereof taken on the line 3—3 of FIG. 1.

FIG. 4 is a front bow end view of the clarifier in a cross-section of the ditch taken on the line 4—4 of FIG. 1.

FIG. 5 is a partial plan view of the clarifier inlet end.

FIG. 6 is a partial plan view of the clarifier downstream end.

FIG. 7 is a cross-sectional side view of clarifier outlet end taken on the line 7—7 of FIG. 6.

FIG. 8 is an internal partial side view of the ditch partition wall within the clarifier showing clarifier truss connections.

DETAILED DESCRIPTION

The orbital system 10 shown in FIG. 1 includes an elongated mixed liquor holding tank 11 which has two vertical sidewalls 12 and 14 and two curved vertical or otherwise configured end walls 15 and 16 connected between opposed ends of sidewalls 12 and 14. The tank 11 has a floor shown as channel bottom 17a in a first channel reach and a channel bottom 17b in a second return channel reach. The tank is mounted normally on ground level 9 (FIG. 3). A vertical curvilinear turning wall 18 may be utilized to guide the flow of mixed liquor between the various channels. The invention may be used in various configurations of one or more orbital channels. A vertically-disposed partition in the form of a wall 20 is mounted equidistant between and substantially parallel to sidewalls 12 and 14 and with the partition wall ends spaced from end walls 15 and 16 so that an endless, circuitous channel 21 is formed in the tank. An inlet conduit 22 is connected to the tank to permit a wastewater mixed liquor influent to fill the tank to a desired level 23 (FIG. 2).

In the event an orbital system as taught by U.S. Pat. No. 3,510,110 is to be employed, a vertically disposed surface aerator 24 and associated drive motor (not shown) is mounted on a walkway 25 at one end of the tank adjacent curved end wall 16. The aerator includes a rotating impeller with a plurality of blades extending radially from a vertical shaft and located slightly below the wastewater surface level so that as the impeller rotates, the mixed liquor in the channel is driven to move as indicated by the FLOW arrows and the mixed liquor is agitated so that the liquor is aerated. Other means for moving and aerating the mixed liquor may be employed such as by horizontal rotating brushes positioned across a channel or bottom mounted diffusers or standard draft tube aerators.

The clarifier 30 of the invention is mounted in a top-facing notch (FIG. 8) of the partition 20 so that the clarifier straddles across the partition. Clarifier 30 is formed as an elongated vessel having vertical upper sidewalls 31 and 32 connected to inclined lower sidewalls 33 and 34, a vessel bottom 39 (FIG. 2) having sludge exit ports 40, a bow section 35 and a closed stern section 36. One side 37 of the bow section facing into the mixed liquor flow contains a pair of vertically movable gates 51, 52 (FIG. 4) which are operable to control the flow of a portion (shown by arrows 38) of the mixed liquor in the circuitous channel 21 into the clarifier. The clarifier sidewalls 33 and 34 are preferably inclined at an angle of about 60°±10° so as to permit settling sludge to slide downwardly on the inclined surfaces into the outer longitudinal rows of sludge ports 40.

The clarifier influent portion is conducted into the clarifier at the bow section side 37 and after distribution in the clarifier (FIG. 5), flows co-currently with the mixed liquor in the return reach of channel 21. The remaining mixed liquor in the channel passes under the clarifier vessel bottom 39 and sludge ports 40 and past the outside of the vertical and inclined sidewalls of the clarifier vessel.

Clarification of the portion of mixed liquor takes place in the clarifier with sludge settling out as the clarifier influent portion moves down the clarifier. A series of clarifier effluent troughs 41, as also seen in FIG. 3, are provided at the downstream end of the clarifier to remove clarified liquor through an effluent outlet 42. Scum and floating material in the clarifier may be removed by a scum system such as seen in FIGS. 6 and 7.

As seen in FIG. 2, the vessel bottom 39 includes a series of longitudinally extending inclined plates 43 and 44 which extend at their bottom edges to a flat horizontal longitudinal plate 45 having a series of rectangular ports therein. The ports may be cut out on three sides and the cut metal or plastic bent down as a flap to direct sludge flow into the same direction as the mixed liquor flowing therebeneath. Other types of sludge ports such as tubes or circular bottom apertures may be employed. The clarifier bow section 35 includes an internal baffle 46 having spaced apertures 47 which aid in directing the mixed liquor portion flow into the main volume of the clarifier and in arresting the mixed liquor portion flow rate. Normally, the flow rate of the mixed liquor in the channel 21 is about 1.0 foot/sec , while the increased flow velocity across section 2—2, for example, will be in the range of about 1.2 to about 1.4 feet/sec.

The clarifier 30 is mounted on the top 48 (FIG. 7) of one or more notches in partition 20. Suitable truss or other support structures 49 (FIG. 5) extend from the partition 20 to the inclined sidewalls 33 and 34 so as to support and stabilize the clarifier.

The bow end of the clarifier 30 is seen in FIG. 4 including a pair of inlet gates 51 and 52 which are vertically movable into a full open or closed or intermediate position by movement of a standard screw raising mechanism 53. The gates may comprise a flat closure plate which slides up and down within vertical retaining lips on the exterior of that part of the bow section facing the flow of mixed liquor in the channel 21. The gates 51 and 52, providing in a typical embodiment a two foot by two foot opening, are preferably spaced about one foot below the water level 23 so as to minimize the entry of scum or other floating matter into the clarifier. The gate maximum open area will be dependent on the clarification capacity of the clarifier vessel. The amount of flow coming into the vessel is approximately equal to the flow velocity of the mixed liquor times the inlet gate(s) inlet cross-sectional area. Gate 51 feeds the half of the clarifier which faces channel wall 12 while gate 52 feeds the other half of the clarifier facing channel wall 14. It is to be noted that partition 20 in FIG. 4, forward of the bow section toward channel end 15, extends at full height from the channel bottom floor to above the mixed liquor level 23 in the channel 21. Inwardly of the clarifier, the partition is notched so that there is essentially freedom of flow of the portion of the mixed liquor being clarified across the length and breadth of the clarifier.

FIG. 5 illustrates the distribution of the influent portion of mixed liquor entering the clarifier 30 through the gates. Influent entering gate 51 passes into a chamber 56 and influent entering gate 52 passes into a chamber 55. The chambers are separated by a vertical wall 54. Each increment of mixed liquor passes through spaced apertures in a vertical baffle plate 57 into downstream chambers 58 and 59, respectively, in opposite halves of the clarifier. The partition is notched between the chambers 58 and 59 to allow cross-flow. The increments of influent then pass through similar apertures 47 in parallelly-spaced baffle 46, the apertures in the respective baffles being staggered so as to provide a tortuous flow path to permit arresting the clarifier influent flow rate in a prescribed amount as discussed above. The baffles 46 and 57 in a preferred embodiment extend across the width of the vessel and from the vessel bottom to above the liquid level in the vessel. The arrows show the clarifier influent flow movement into the settling zone 60 of the clarifier. In notching the partition 20, more appropriately in pouring a concrete partition, upstanding pylons 61 are formed in the partition for mounting the truss structure 49. The longitudinal bottom of the clarifier is anchored against the partition at 48 as seen in FIGS. 2, 3 and 8.

FIG. 6 illustrates in more detail the preferred construction of the internals of the clarifier at the downstream end. Two pairs of scum funnels 63 are provided for pick-up of floating scum or other floating material in the clarifier, one set being between parallel to effluent troughs 41. Pipes 64 convey the scum to a scum trough 65 and scum exit pipe 66. As seen in FIG. 7, a telescoping closure valve 72 is provided in the scum drain trough to control the outflow of scum. Clarified liquor in the clarifier passes over weirs 67 in each of troughs 41 and as indicated by the arrows (FIG. 6) and then into a cross-trough 68 to a sump 69 and outlet pipe 70 for removal. FIG. 7 shows the orientation of the sludge port flaps 73 so that as shown by the curved arrows 74, settled sludge exits the clarifier into the channel mixed liquor flow stream shown as arrows 75. The anchoring locations of the clarifier vessel to the partition are seen clearly at 48.

FIG. 8 more clearly shows the notched partition 20 and one of a series of upstanding pylons 61 for anchoring the supporting truss work 49. Truss connection strips 76 and 77 are connected to the partition wall 20 and to the sides of "saw-tooth" type pylons or columns 61, respectively. In a preferred embodiment, the top 78 of the pylon is at a depth B of about 3 to 4 feet below the clarifier water level and the pylon has a width C of about 2 feet. A space A between each pylon and the last pylon and the full height partition wall is about 6 feet wide providing for a large area opening 78 permitting cross-flow of the clarifier mixed liquor influent portion between the longitudinal halves of the clarifier vessel. FIG. 8 also illustrates the downstream orientation of sludge port flaps 73 in channel 21 above bottom 17a of the orbital ditch. The top of the two most inboard clarifier sludge troughs 7 and 8 formed by the inclined plates are mounted onto the partition at anchor locations 48 (FIG. 2).

The above description of embodiments of this invention is intend to be illustrative and not limiting. Other embodiments of this invention will be obvious to those skilled in the art in view of the above disclosure.

We claim:

1. In combination with an orbital ditch comprising a pair of upstanding sidewalls spacedly separated by an upstanding partition and forming a pair of parallel channels each having a channel bottom for circuitous flow and oxidation of mixed liquor;
   means for forming an elongated top-facing notch in said partition; and
   a clarifier vessel positioned in said notch, said vessel having upstanding sidewalls spaced from said ditch sidewalls and a bottom forming a vessel interior and separating said vessel interior from said channels, said vessel bottom extending above each of said channel bottoms.

2. The combination of claim 1 wherein said clarifier vessel straddles said partition and wherein one of said vessel sidewalls extends into one of said orbital channels and another of said vessel sidewalls extends into the other of said channels, said parallel channels and said vessel having the same mixed liquor level therein.

3. The combination of claim 1 wherein said clarifier vessel includes a bow section extending into one of said channels, said bow section having inlet means for receiving a portion of mixed liquor flowing toward said inlet; and wherein said portion flows through said vessel interior co-currently with remaining portions of mixed liquor flowing in said one of said channels past said inlet.

4. The combination of claim 3 wherein said clarifier vessel includes a stern section, said stern section including a clarifier effluent removal trough and bottom sludge ports to return settled sludge in said mixed liquor portion to at least one of said channels.

5. The combination of claim 4 further comprising means for adjusting said inlet to adjust the amount of said mixed liquor portion entering said vessel so as to control the flow rate of sludge from said sludge ports.

6. The combination of claim 3 in which said inlet is at least one gate extending across said bow below the surface level of said mixed liquor in said one of said channels.

7. The combination of claim 6 in which said gate is adjustable to control the outflow of settled sludge in said vessel.

8. The combination of claim 1 wherein said vessel and said partition notch extends from about 30% to 90% of the longitudinal length of said partition.

9. The combination of claim 1 wherein said vessel and said partition notch extends along about 50% of said partition length.

10. The combination of claim 1 wherein said vessel has a top width from about 40% to 60% of the total width of said pair of channels.

11. The combination of claim 1 wherein said vessel has a top width about 50% of the total width of said channels.

12. The combination of claim 1 wherein said clarifier vessel sidewalls are tapered inwardly from adjacent a top edge to said vessel bottom and wherein said vessel bottom includes sludge ports in a downstream section of said vessel to return sludge settled in said clarifier vessel to said orbital channels.

13. The combination of claim 12 wherein one of said tapered vessel sidewalls extends longitudinally in one of said orbital channels and the other of said tapered vessel sidewalls extends longitudinally in the other of said orbital channels.

14. The combination of claim 12 wherein said vessel bottom comprises longitudinal rows of pairs of inclined sideplates, said sludge ports extending in longitudinal rows between said pairs of inclined sideplates.

15. The combination of claim 12 wherein said sludge ports are positioned at a bottom extension of said tapered sidewalls.

16. In combination an orbital ditch comprising a pair of upstanding sidewalls spacedly separated by an upstanding first partition forming a pair of channels each having a channel bottom;
   means in said ditch for propelling a mixed liquor circuitously through said orbital ditch;
   means for forming an elongated top-facing notch in said first partition;
   a clarifier vessel for separation of sludge and effluent in said mixed liquor and positioned in said notch, said clarifier vessel having a bottom and at least a pair of vessel sidewalls forming a vessel interior;
   wherein said vessel sidewalls form a second partition offset from said first partition, said second partition and said bottom separating said vessel interior from said pair of channels, said vessel bottom extending above each of said channel bottoms;
   inlet means in said vessel for introduction of a portion of the mixed liquor into said vessel;
   means adjacent to said vessel bottom for returning settled sludge in said vessel to at least one of said channels; and
   means adjacent a top of said vessel to remove clarified liquid from said vessel.

17. The combination of claim 16 wherein said inlet means is positioned in one of said channels facing into the propelled flow in said one channel.

18. The combination of claim 17 in which said inlet means comprises at least one gate positioned in a bow of said vessel and positioned below a top level of mixed liquor flowing in said one channel past said bow.

19. The combination of claim 18 in which said inlet means comprises a pair of horizontally aligned inlet gates, and further comprising means in said bow for distributing a portion of mixed liquor flowing from said one channel into said inlet means across an interior width of said vessel and for arresting the flow velocity of said portion of mixed liquor in said vessel.

20. The combination of claim 19 wherein said means for distributing and arresting comprises a pair of apertured spaced baffle plates extending laterally across said vessel downstream of said inlet gates and wall means extending between an outer wall of said bow and one of said baffles for forming a pair of feed chambers, one of said chambers directing flow from one of said gates along one downstream side of said vessel on one side of said first partition and the other chamber directing flow from the other of said gates along the other downstream side of said vessel on the other side of said first partition.

21. A combined orbital ditch and intraclarifier wherein said ditch comprises a pair of parallel vertical side walls; a ditch floor; a spaced vertical central partition between said sidewalls; and end walls; said partition having ends spaced from said end walls and forming a circuitous channel pathway between the partition and said sidewalls and end walls, including a pair of parallel flow channels;
   means for propelling a mixed liquor around said channel pathway and through said flow channels; and a longitudinally extending clarifier vessel of finite width positioned on a notch in a longitudinal length of said partition and spaced from said partition ends;

wherein said clarifier vessel extends laterally from said partition into each of said flow channels to a position spaced from said parallel vertical sidewalls and wherein said clarifier vessel has a bottom located above the ditch floor; and wherein said clarifier vessel includes inlet means at one end for introduction of a portion of said mixed liquor in said flow channels into said clarifier vessel; a longitudinally extending settling zone; means for removing clarified liquid from said clarifier vessel; and means for removing settled sludge from said clarifier vessel and for flowing said settled sludge into said flow channels under said clarifier vessel.

22. The orbital ditch and intraclarifier of claim 21 wherein said inlet means is positioned in one of said channels facing into the propelled flow in said one channel.

23. The orbital ditch and intraclarifier of claim 22 in which said inlet means comprises at least one gate positioned in a bow of said clarifier vessel and positioned below a top level of mixed liquor flowing in said one channel past said bow.

24. The orbital ditch and intraclarifier of claim 23 in which said inlet means comprises a pair of horizontally aligned inlet gates, and further comprising means in said bow for distributing a portion of mixed liquor flowing from said one channel into said inlet means across an interior width of said clarifier vessel and for arresting the flow rate of said portion of mixed liquor in said clarifier vessel.

25. The orbital ditch and intraclarifier of claim 24 wherein said means for distributing and arresting comprises a pair of apertured spaced baffle plates extending laterally across said clarifier vessel downstream of said inlet gates and wall means extending between an outer wall of said bow and one of said baffles forming a pair of feed chambers, one of said chambers directing flow from one of said gates along one downstream longitudinal side of said clarifier vessel on one side of said partition and the other chamber directing flow from the other one of said gates along the other downstream side of said clarifier vessel on the other side of said partition.

26. The orbital ditch and intraclarifier of claim 21 where said clarifier vessel includes a bow section extending into one of said channels, said bow section having an inlet for receiving a portion of mixed liquor flowing toward said inlet; and wherein said portion flows through said clarifier vessel interior co-currently with remaining portions of mixed liquor flowing in said one of said channels past said inlet.

27. The orbital ditch and intraclarifier of claim 26 in which said inlet comprises at least one gate extending across said bow below the surface level of said mixed liquor in said one of said channels.

28. The orbital ditch and intraclarifier of claim 21 in which said clarifier vessel extends from about 30% to 90% of the longitudinal length of said partition.

29. The orbital ditch and intraclarifier of claim 21 wherein said clarifier vessel extends cantilevered from said partition into each of said channels and said clarifier vessel has a top width from about 40% to 60% of the total width of said pair of channels.

30. The orbital ditch and intraclarifier of claim 21 wherein said clarifier vessel includes inwardly-inclined longitudinal sidewalls extending downwardly from adjacent a top longitudinal edge of said clarifier vessel to a bottom of said clarifier vessel, and said means for removing settled sludge being positioned adjacent an intersection of said inclined walls and said clarifier vessel bottom.

31. The orbital ditch and intraclarifier of claim 21 wherein said clarifier vessel includes a truss means extending from said partition to opposed outside longitudinal walls forming sides of said clarifier vessel for supporting said clarifier vessel.

32. The orbital ditch and intraclarifier of claim 31 in which said partition is notched to form a series of vertical spaced pylons, said truss means being connected to said pylons and wherein a transverse passage is formed between said pylons to permit freedom of flow between longitudinal halves of said clarifier vessel.

33. In combination an orbital ditch comprising a pair of upstanding sidewalls spacedly separated by an upstanding first partition forming a pair of channels;

means in said ditch for propelling a mixed liquor circuitously through said orbital ditch;

means for forming an elongated top-facing notch in said first partition;

a clarifier vessel for separation of sludge and effluent in said mixed liquor and positioned in said notch, said clarifier vessel having a bottom and at least a pair of vessel sidewalls forming a vessel interior;

wherein said vessel sidewalls form a second partition offset from said first partition, said second partition and said bottom separating said vessel interior from said pair of channels;

inlet means in said vessel for introduction of a portion of the mixed liquor into said vessel;

means adjacent to said vessel bottom for returning settled sludge in said vessel to at least one of said channels;

means adjacent a top of said vessel to remove clarified liquid from said vessel;

wherein said inlet means is positioned in one of said channels facing into the propelled flow in said one channel;

said inlet means comprising a pair of horizontally aligned inlet gates positioned in a bow of said vessel and positioned below a top level of mixed liquor flowing in said one channel past said bow; and wherein said inlet means further comprises means in said bow for distributing a portion of mixed liquor flowing from said one channel into said inlet means across an interior width of said vessel and for arresting the flow velocity of said portion of mixed liquor in said vessel.

34. The combination of claim 33 wherein said means for distributing and arresting comprises a pair of apertured spaced baffle plates extending laterally across said vessel downstream of said inlet gates and wall means extending between an outer wall of said bow and one of said baffles for forming a pair of feed chambers, one of said chambers directing flow from one of said gates along one downstream side of said vessel on one side of said first partition and the other chamber directing flow from the other of said gates along the other downstream side of said vessel on the other side of said first partition.

35. A combined orbital ditch and intraclarifier wherein said ditch comprises a pair of parallel vertical side walls; a ditch floor; a spaced vertical central partition between said sidewalls; and end walls; said partition having ends spaced from said end walls and forming a circuitous channel pathway between the partition and said sidewalls and end walls, including a pair of parallel flow channels;

means for propelling a mixed liquor around said channel pathway and through said flow channels; and a longitudinally extending clarifier vessel of finite width positioned on a longitudinal length of said partition and spaced from said partition ends;

wherein said clarifier vessel extends laterally from said partition into each of said flow channels to a position spaced from said parallel vertical sidewalls and above the ditch floor;

wherein said clarifier vessel includes inlet means at one end for introduction of a portion of said mixed liquor in said flow channels into said clarifier vessel; a longitudinally extending settling zone; means for removing clarified liquid from said clarifier vessel; and means for removing settled sludge from said clarifier vessel and for flowing said settled sludge into said flow channels under said clarifier vessel;

wherein said inlet means is positioned in one of said channels facing into the propelled flow in said one channel;

in which said inlet means comprises a pair of horizontally aligned inlet gates positioned in a bow of said clarifier vessel and positioned below a top level of mixed liquor flowing in said one channel past said bow; and in which said inlet means further comprises means in said bow for distributing a portion of mixed liquor flowing from said one channel into said inlet means across an interior width of said clarifier vessel and for arresting the flow rate of said portion of mixed liquor in said clarifier vessel.

36. The orbital ditch of claim 35 wherein said means for distributing and arresting comprises a pair of apertured spaced baffle plates extending laterally across said clarifier vessel downstream of said inlet gates and wall means extending between an outer wall of said bow and one of said baffles forming a pair of feed chambers, one of said chambers directing flow from one of said gates along one downstream longitudinal side of said clarifier vessel on one side of said partition and the other chamber directing flow from the other one of said gates along the other downstream side of said clarifier vessel on the other side of said partition.

* * * * *